United States Patent
Brown et al.

(10) Patent No.: US 9,848,255 B1
(45) Date of Patent: Dec. 19, 2017

(54) METHOD FOR MANUFACTURING A PLASTIC SPEAKER GRILL FOR WIRELESS SPEAKER ASSEMBLY

(71) Applicants: Christopher Jack Brown, Deming, WA (US); Chad Mark Gibbon, Horace, ND (US)

(72) Inventors: Christopher Jack Brown, Deming, WA (US); Chad Mark Gibbon, Horace, ND (US)

( * ) Notice: Subject to any disclaimer, the term of this patent is extended or adjusted under 35 U.S.C. 154(b) by 318 days.

(21) Appl. No.: 14/521,434

(22) Filed: Oct. 22, 2014

Related U.S. Application Data

(60) Provisional application No. 61/961,709, filed on Oct. 22, 2013.

(51) Int. Cl.
*H04R 1/02* (2006.01)
*B29C 45/00* (2006.01)
(Continued)

(52) U.S. Cl.
CPC ......... *H04R 1/023* (2013.01); *B29C 45/0025* (2013.01); *B29C 45/0055* (2013.01); *B29C 2045/0058* (2013.01); *B29C 2045/0077* (2013.01); *B29C 2045/14442* (2013.01); *B29C 2793/0009* (2013.01); *B29K 2101/12* (2013.01); *B29L 2031/3418* (2013.01)

(58) Field of Classification Search
None
See application file for complete search history.

(56) References Cited

U.S. PATENT DOCUMENTS

| 4,196,791 A | 4/1980 | Gottlieb |
| 4,832,150 A | 5/1989 | Just et al. |

(Continued)

FOREIGN PATENT DOCUMENTS

| DE | 102011008995 A1 | 6/2012 |
| EP | 0502841 B1 | 11/1994 |

(Continued)

OTHER PUBLICATIONS alibaba.com website, Plastic Injection Speaker Grill Mould, http://www.alibaba.com/products-directory/recommended-plastic-injection-speaker-grill-mould.html.
(Continued)

*Primary Examiner* — Edmund Lee
(74) *Attorney, Agent, or Firm* — Michael R. Schacht; Schacht Law Office, Inc.

(57) ABSTRACT

A method for manufacturing a plastic speaker grill is provided. The method includes the steps of providing a base member having a first side and an opposing second side and defining a thickness therebetween. The base member has a plurality of spaced blind holes wherein the first side is in communication with the plurality of blind holes and the second side defines a surface that is generally uniform and uninterrupted. The method further includes cutting the base member proximate the second side to remove a portion of the base member and define the speaker grill, and in response to cutting the base member, exposing the blind holes wherein the blind holes define apertures that extend completely through the speaker grill. A plastic speaker grill is provided having tightly-spaced and miniscule apertures.

6 Claims, 8 Drawing Sheets

(51) Int. Cl.
*B29L 31/34* (2006.01)
*B29K 101/12* (2006.01)
*B29C 45/14* (2006.01)

(56) References Cited

U.S. PATENT DOCUMENTS

| | | | |
|---|---|---|---|
| 5,419,865 A | 5/1995 | Ogata et al. | |
| 5,690,886 A | 11/1997 | Kurihara | |
| 5,754,669 A * | 5/1998 | Shiota | H04R 1/023 381/189 |
| 5,825,903 A * | 10/1998 | Shiota | H04R 1/023 381/189 |
| 6,899,843 B2 | 5/2005 | Homann | |
| 7,425,361 B2 | 9/2008 | Ishii | |
| 2001/0041245 A1 * | 11/2001 | Funakoshi | B29C 44/083 428/131 |
| 2006/0043642 A1 * | 3/2006 | Yang | B29C 44/0446 264/321 |
| 2006/0151910 A1 * | 7/2006 | Schoemann | B60J 5/0416 264/250 |
| 2008/0052966 A1 * | 3/2008 | Pan | A43B 3/108 36/3 B |
| 2013/0001971 A1 * | 1/2013 | Stein | B60R 13/02 296/1.08 |

FOREIGN PATENT DOCUMENTS

| | | | |
|---|---|---|---|
| EP | 0796032 A2 | | 9/1997 |
| FR | 2690300 | | 10/1993 |
| FR | 2787055 | | 6/2000 |
| GB | 2279288 | | 1/1995 |
| JP | 04018315 | * | 1/1992 |
| JP | 2002-103374 | * | 4/2002 |
| JP | 2015109534 | * | 6/2015 |
| WO | 2011010187 A1 | | 1/2011 |

OTHER PUBLICATIONS alibaba.com website, Single 12-inch plastic speaker&plastic speaker grills, http://gzaoyue.en.alibaba.com/product/932066007-213418998/Single_12_inch_plastic_speaker_plastic_speaker_grills.html.

* cited by examiner

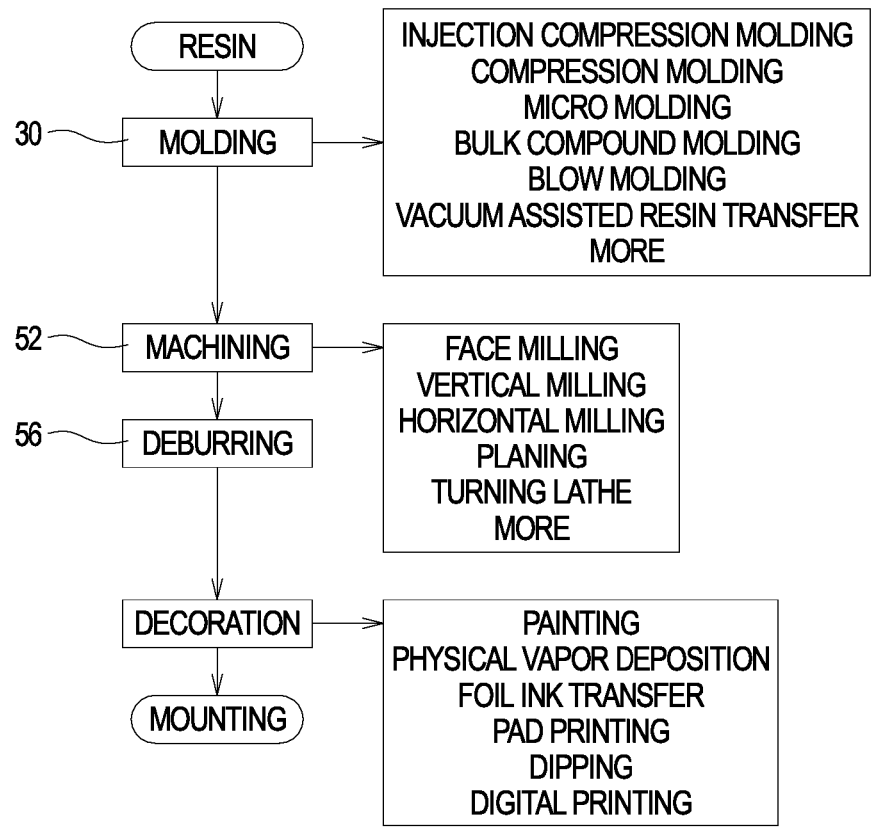
FIG. 5 PLASTIC SPEAKER GRILL PROCESS FLOW CHART
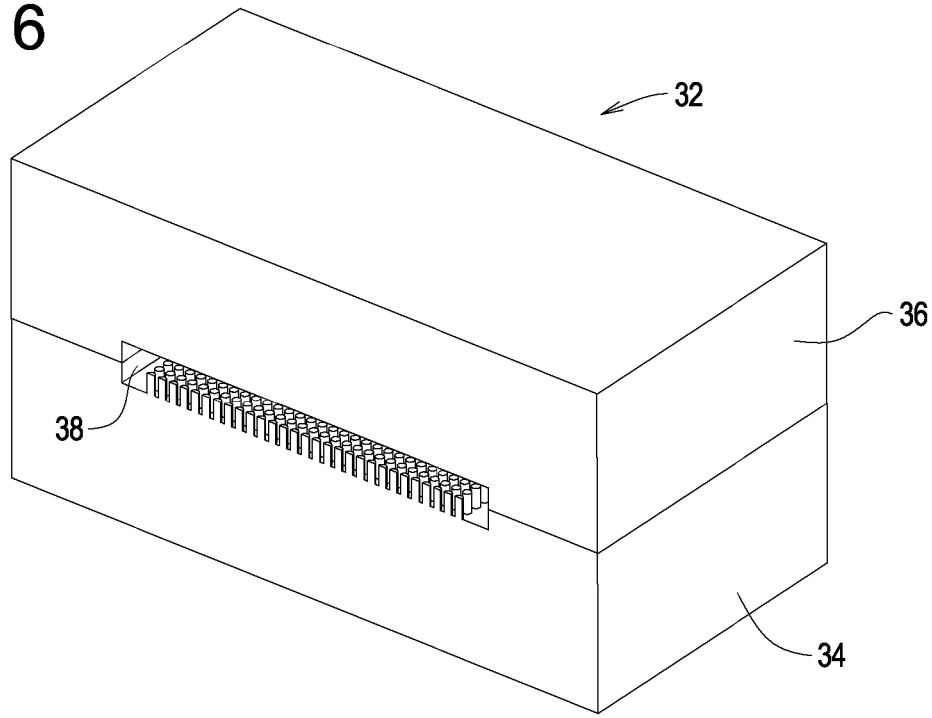
FIG. 6

METHOD FOR MANUFACTURING A PLASTIC SPEAKER GRILL FOR WIRELESS SPEAKER ASSEMBLY

CROSS-REFERENCE TO RELATED APPLICATION

This application, U.S. patent application Ser. No. 14/521,434 filed Oct. 22, 2014, claims the benefit of U.S. Provisional Application No. 61/961,709 filed Oct. 22, 2013, which is incorporated herein by reference in its entirety.

FIELD OF THE INVENTION

The present invention relates generally to a wireless speaker assembly and, in particular, to a plastic speaker grill used in a wireless speaker assembly and a method of manufacturing the plastic speaker grill.

BACKGROUND OF THE INVENTION

Wireless speaker assemblies are generally known in the art. Wireless speaker assemblies are used in a variety of different applications such as in a high-end, in-home wireless audio system that eliminates the need to hide unsightly wires within walls and ceilings. Another application is in the form of a portable audio system that can be easily moved from location to location and used with portable, hand-held devices such as smartphones that play music, or other portable audio devices, etc.

A traditional wireless speaker assembly may include a plurality of speakers, a base unit and other possible audio components that are operably connected wirelessly via a dedicated wireless network. In such systems, WiFi (e.g., wireless local area network products) signals travel from speaker-to-speaker so that information is communicated from one speaker to another in operation of the system. To assure proper communication between speakers and overall operation, the WiFi signals must be of sufficient strength so that the signals can be effectively transmitted to a receiving speaker. It is understood that other wireless communication signals are possible such as Bluetooth or other radio frequencies.

The speakers of the wireless speaker assembly typically include a speaker grill positioned over the internal components of the speaker. Speaker grills are typically made of metal and have a plurality of tightly-spaced miniature holes that pass through the speaker grill. In order for speaker grills to include holes of such a small diameter (e.g., between 0.30 mm and 1.20 mm), a small center-to-center pitch spacing (between 0.50 mm and 1.50 mm) and thin part thickness (between 0.40 mm and 3.0 mm) is required. To achieve such an intricate structure, metal speaker grills are typically printed and the holes are created by a chemical etching process. Because of their metal construction, speaker grills can interfere with the transmission and reception of the WiFi signals in wireless speaker assemblies. This interference can adversely affect the performance of the speaker including sound quality or the ability to project any audio. When signal interference is present, individual speakers of the wireless speaker assemblies must then be placed in closer proximity to one another to provide adequate performance.

It would be beneficial for the speaker grills to be made of non-metal materials such as plastic. A plastic speaker grill would minimize potential signal interference, thereby improving the performance of the wireless speaker assembly. Individual speakers could then be placed farther apart from one another. However, plastic speaker grills having such intricate constructions, including the tightly-spaced miniature holes, have not been able to be manufactured.

While, according to the prior art, wireless speaker assemblies provide a number of advantageous features, they nevertheless have certain limitations. The present invention is provided to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY OF THE INVENTION

The present invention is designed to address at least one of the aforementioned problems and/or meet at least one of the aforementioned needs.

According to a first aspect of the invention, a method of manufacturing a plastic speaker grill having an intricate structure is disclosed. The method includes providing a base member having a first side and an opposing second side and defining a thickness therebetween, the base member having a plurality of spaced blind holes, wherein the first side is in communication with the plurality of blind holes and the second side defines a surface that is generally uniform and uninterrupted. The method further includes cutting the base member proximate the second side to remove a portion of the base member and define the speaker grill, and in response to cutting the base member, exposing the blind holes wherein the blind holes define apertures that extend completely through the speaker grill.

According to another aspect of the invention, a method for manufacturing a plastic speaker grill comprises the steps of injecting molten plastic material in a mold member to form a base member having a first side and an opposing second side and defining a thickness therebetween. The base member has a plurality of spaced blind holes, wherein the first side is in communication with the plurality of blind holes and the second side defines a surface that is generally uniform and uninterrupted. The method further includes cutting the base member proximate the second side to remove a portion of the base member and define a grill member, wherein the base member is cut at a location such that closed ends of the blind holes are removed, wherein apertures are defined in the grill member, and wherein the apertures extend completely through the grill member.

According to a further aspect of the invention, the method may also comprise the steps of deburring the base member to remove unwanted remnants of plastic material in the form of burrs. Decorative material may also be applied to the speaker grill.

According to an additional aspect of the invention, a method for manufacturing a plastic speaker grill comprises the steps of: providing a first mold member and a second mold member collectively defining a cavity, the first mold member having a plurality of spaced mold pins extending into the cavity wherein distal ends of the pins are spaced from the second mold member; injecting molten plastic into the cavity and around the plurality of spaced mold pins to form a base member, the base member having a first side and an opposing second side and defining a thickness therebetween, the base member having a plurality of spaced blind holes, wherein the first side is in communication with the plurality of blind holes and the second side defines a surface that is generally uniform and uninterrupted: removing the base member from the mold members; cutting the base member proximate the second side to remove a portion of the base member and define a grill member, wherein the removed portion of the base member exposes the blind holes to define apertures that extend completely through the grill member; and deburring the grill member to remove unwanted remnants of plastic material. The method may also include depositing colored material onto the grill member after the step of deburring. The grill member may also be cut to define a desired outer periphery.

According to another aspect of the invention, a speaker grill has a plastic injected molded member having a plurality of spaced apertures extending completely through the molded member. The spaced apertures are initially formed as blind holes in the plastic injected molded member and wherein a portion of the molded member is removed, and wherein the apertures are exposed at a first side of the molded member and a second side of the molded member to extend completely through the molded member. In an exemplary embodiment, the apertures have a diameter generally in the range of about 0.30 mm to about 1.20 mm. The speaker grill also has the apertures with a center-to-center pitch spacing of generally between 0.50 mm and 1.50 mm. The speaker grill has a thickness in the range of about 0.40 mm to about 3.0 mm.

According to another aspect of the invention, the molded member of the speaker grill defines a rib member that separates the apertures into groups of apertures. In an exemplary embodiment, the rib member has intersecting rib members that define the apertures into four groups of apertures.

Other objects, features, embodiments and advantages of the invention will be apparent from the following specification taken in conjunction with the following drawings.

BRIEF DESCRIPTION OF DRAWINGS

FIG. 5 is a schematic diagram of a process flow chart for manufacturing the speaker grill according to an exemplary embodiment of the present invention;

FIG. 6 is a partial schematic view of cavity and core insert mold members used in the process for manufacturing the speaker grill according to an exemplary embodiment of the present invention;

DETAILED DESCRIPTION

The present invention is directed to a plastic speaker grill used in a wireless speaker assembly and a method of manufacturing the plastic speaker grill.

Figure 1:
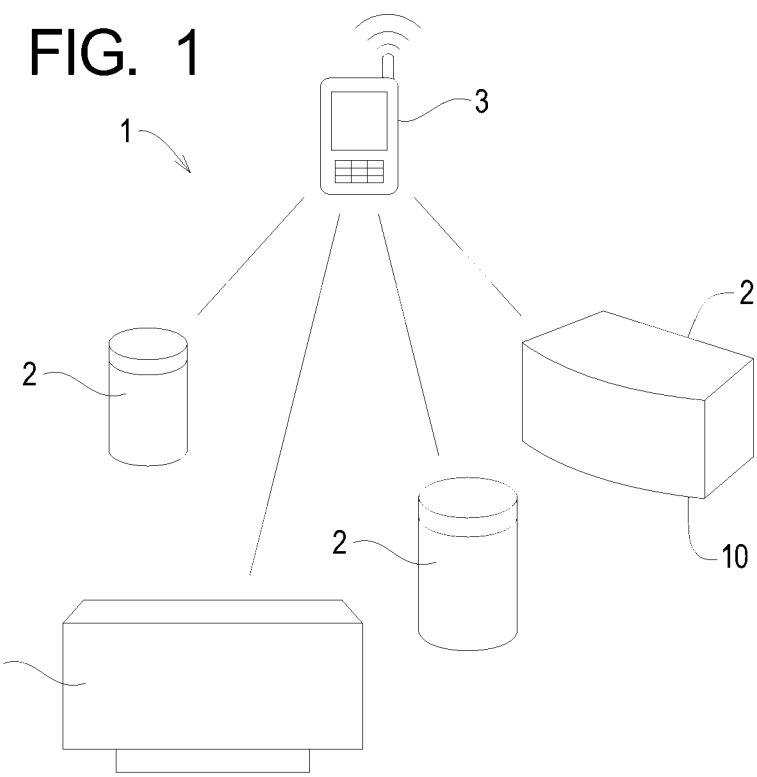
FIG. 1 is a schematic view of a typical wireless speaker assembly.

FIG. 1 shows a schematic view of a typical wireless speaker assembly, generally designated with the reference numeral 1. The wireless speaker assembly typically includes a plurality of speakers 2. In contrast to prior configurations, each speaker may utilize a speaker grill formed in accordance with exemplary embodiments of the invention described herein and generally designated with the reference numeral 10. It is understood that the speaker grill 10 shown in FIG. 1 is in schematic form and that the other speakers 2 in FIG. 1 will have a speaker grill 10 manufactured in accordance with the present invention. As is known in the art, the speakers 2 of the assembly 1 have the necessary components to communicate via the transmission and reception of signals among the speakers 2. The wireless speaker assembly 1 may be controlled via a controller that may take different forms including a smart device such as a smart phone 3. The smart phone 3 may have an application downloaded thereon to assist in the operational control of the system 1. It is understood that the wireless speaker system 1 may include other components including but not limited to base units, other types of speakers, or additional controllers.

As shown in FIG. 1, the speakers 2 are typically constructed and have a case or cabinet that house and support the components of the speaker. The speaker 2 also has a speaker grill 10 constructed in accordance with the present invention.

Figure 2:
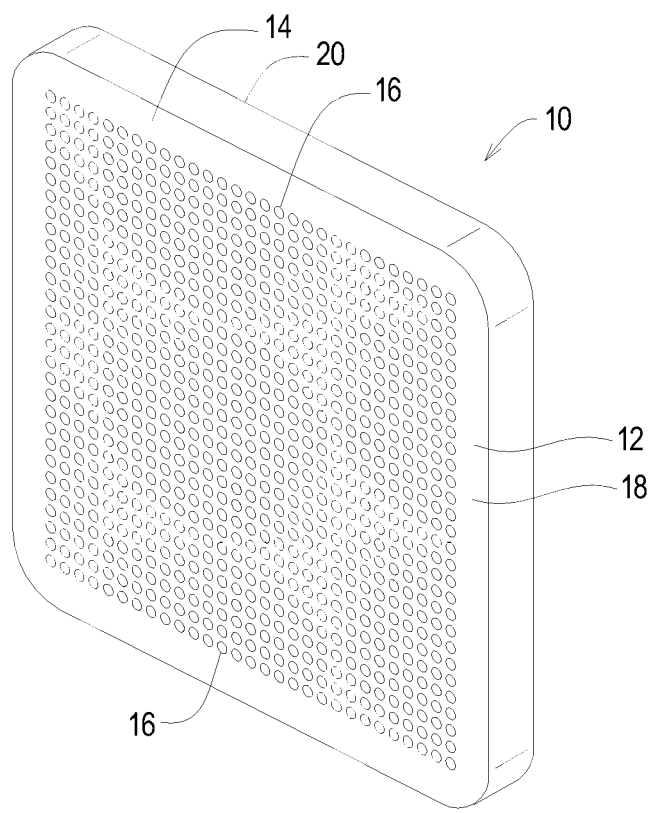
FIG. 2 is a perspective front view of a speaker grill used in a wireless speaker assembly according to an exemplary embodiment of the present invention.

FIG. 2 shows an exemplary embodiment of the speaker grill 10 of the present invention. The speaker grill 10 has a base member 12 that is a molded member and is dimensioned to fit into and cover a structure of the cabinet of the speaker 2. The base member 12 has a peripheral rim member 14 that generally defines an outer periphery of the speaker grill 10. The base member 12 has a plurality of apertures 16 that pass completely through the base member 12. The apertures 16 may also be referred to as through holes 16 as the apertures 16 provide individual passageways from a front side 18, or first side of the base member 12 to a rear side 20, or second side of the base member 12.

Figure 3:
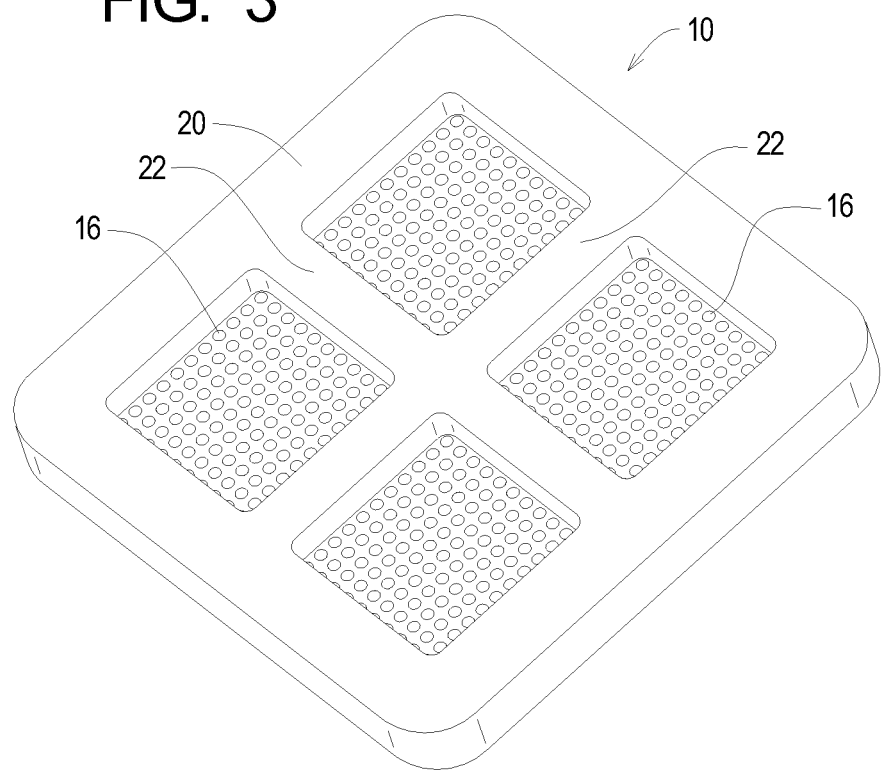
FIG. 3 is a perspective rear view of another exemplary embodiment of a speaker grill used in a wireless speaker assembly according to the present invention.

As shown in FIG. 3, the base member 12 may further include internal rib members 22 that may contribute to the rigidity and support of the speaker grill 10. The rib members 22 may separate the apertures 16 into groups of apertures 16. For example, in FIG. 3, the rib members 22 intersect one another and define the apertures into four distinct groups of apertures 16. Other rib member constructions are also possible.

Figure 4:
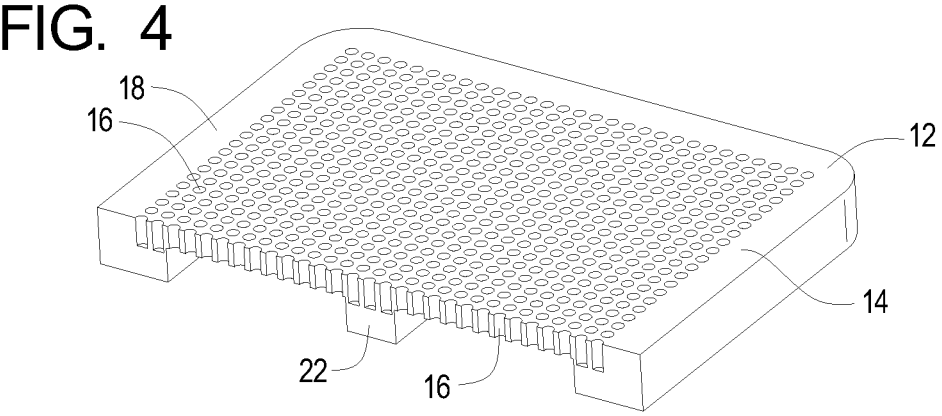
FIG. 4 is a partial perspective view of the speaker grill shown in FIG. 3.

As further shown in FIGS. 2-4, the apertures 16 are in the form of a plurality of tightly-spaced miniature holes that are generally positioned in a central portion of the base member 12 and surrounded by the peripheral rim member 14. Holes that are located more proximate the peripheral rim member 14 may not pass completely through the base member 12 (FIG. 4). The apertures 16 are tightly-spaced in accordance with operational and acoustic requirements. The apertures 16 have a certain diameter and a center-to-center spacing to be described. The thickness of the base member 12 proximate the apertures 16 is less than the thickness of the base member at the location of the rib members 22. Further structural features of the speaker grill 10 will be described in greater detail below.

FIGS. 5-13 disclose the method utilized to manufacture the speaker grill 10 according to an exemplary embodiment of the present invention. The speaker grill 10 has a plastic construction and is formed in a plastic injection molding process. FIG. 5 provides a general overview of the plastic injection molding process that may generally include a molding step and a machining step to provide the apertures 16 in the desired structure to function in the wireless speaker system 1. Additional steps can also be utilized as will be described herein.

The process includes an injection molding machine 30 (FIG. 5) as is known in the art that includes a resin source and plastic injection components such as runners, nozzles, etc. Other components are also used to ensure proper function and may include undercut pullers, cooling channels, stripper plates and pin ejection and injection mechanisms. A mold 32 (see FIG. 6) is provided that includes a plurality of mold members. As shown in FIG. 6, the mold 32 has a first mold member 34 and a second mold member 36. The mold members 34, 36 are dimensioned and structured to form a cavity 38. The mold members 34, 36 can be made from a variety of materials including steel.

Figure 7:
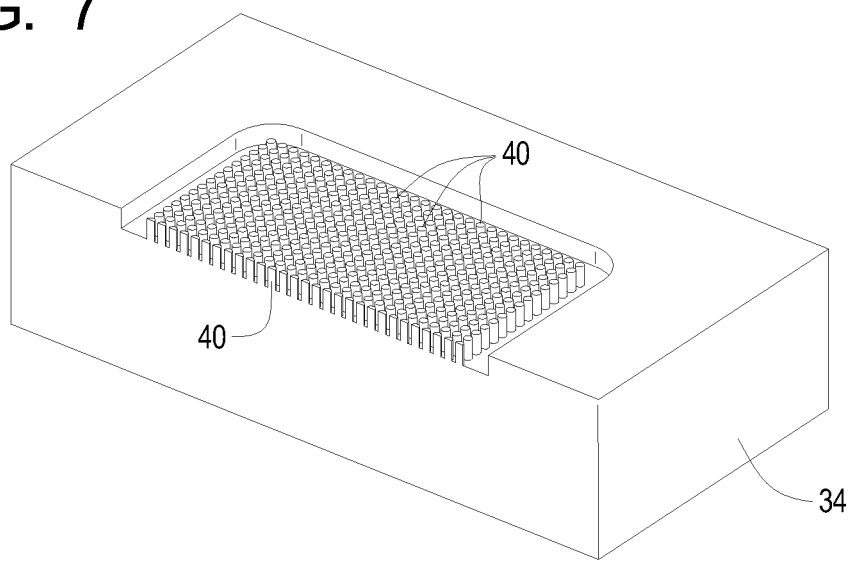
FIG. 7 is a partial schematic view of a cavity insert having permanently attached pins used in the process for manufacturing the speaker grill according to an exemplary embodiment of the present invention.
Figure 7A:
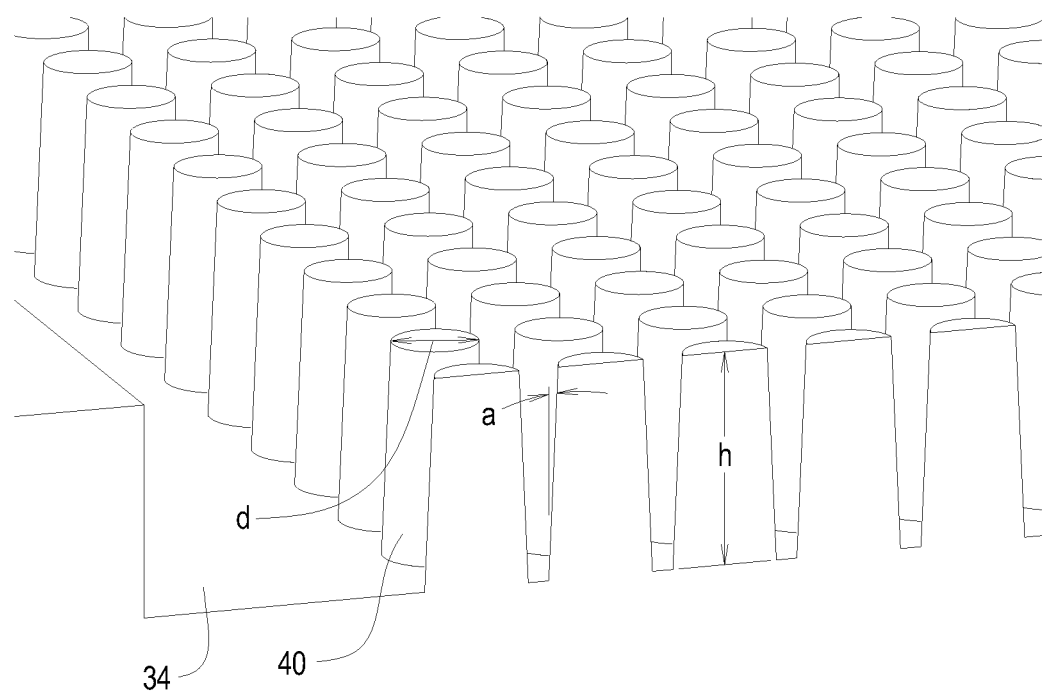
FIG. 7a is an enlarged, partial schematic view of the cavity insert having the permanently attached pins according to an exemplary embodiment of the present invention.
Figure 8:
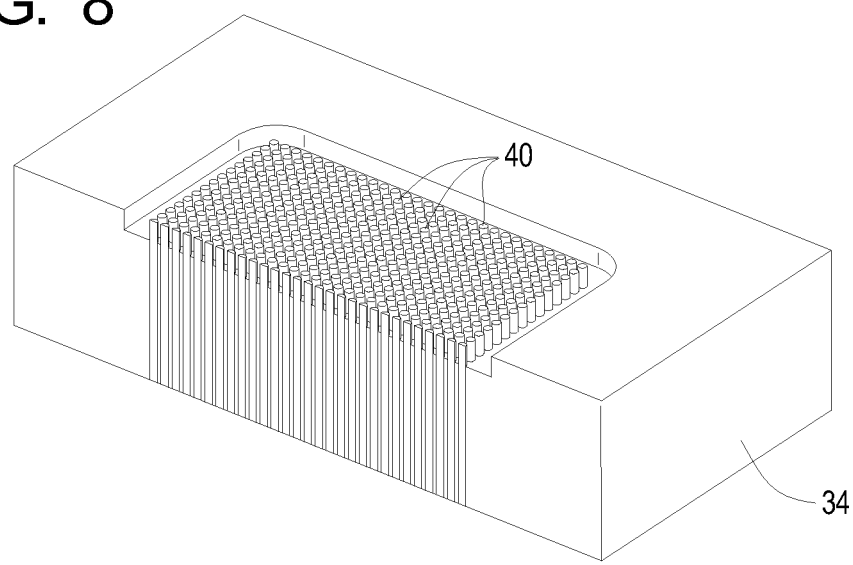
FIG. 8 is a partial schematic view of a cavity insert having individual pins used in the process for manufacturing the speaker grill according to an exemplary embodiment of the present invention.

As shown in FIGS. 6 and 7, one of the mold members has a plurality of individual pins 40 or posts that extend into the cavity 38. In an exemplary embodiment, the first mold member 34, or cavity insert, has the pins 40 integral with and permanently attached to the mold member 34. It is understood the second mold member 36 could alternatively have the pins 40. Pins 40 that are made integral with the mold member 34 can be created by drilling holes in a copper or graphite electrode. The electrode is used in an electrical discharge machine (EDM) process to create the mold member with integral pins, or cavity insert with integral pins. In an alternative embodiment, the cavity insert or mold member 34 could have a plurality of individual pins 40 mounted in the mold member as shown in FIG. 8. The inserted pins 40 can remain a solid portion or post of the mold member. The inserted pins can be made by a various machining operations such as cylindrical grinding, a lathe, electrical discharge machines, vertical milling or other operations. The geometry of the pins 40 is designed and controlled in accordance with the desired end geometry of the apertures 16 of the speaker grill 10. Thus (with reference to FIG. 7a), the overall geometry of the pin 40, e.g., pin diameter d, pin height h and draft angle a is defined by the desired look, feel, strength of the speaker grill 10 as well as function of the speaker grill 10. For example, FIG. 7a shows a partial enlarged view of the mold member 34 having the integral pins 40. The pins 40 each have a pin diameter d, a pin height h and a draft angle a. The pin diameter d is taken generally at a distal end of the pin 40. With the draft angle a, the pin diameter increases towards a base of the pin 40. It is understood that in one exemplary embodiment, the pins 40 have generally identical constructions and dimensions. In other exemplary embodiments, it is understood that the pins 40 can have varying constructions and dimensions according to the desired properties of the speaker grill 10. In one particular exemplary embodiment, the pins 40 have a pin diameter d of approximately 0.7 mm, a pin height h of approximately 1.5 mm, and a draft angle a of approximately 3 degrees. It is further understood that distal ends of the pins 40 of the first mold member 34 are spaced from the second mold member 36 in the cavity 38.

The mold members 34, 36 of the mold 32 are positioned in operable communication with the plastic injection molding machine 30. The desired resin is selected for the particular speaker grill 10 to be manufactured. The molten resin is injected into the cavity 38 defined by the mold members 34, 36. Wall sections behind and below the pins 40 allow for the molten plastic to flow along, around and down each pin without short shots or interruption of the grill hole-pattern geometry during the plastic injection molding process. The flow of the plastic in the cavity 38 and around the pins 40 is such that weld lines are avoided and minimized to enhance structural rigidity of the part. A plastic injection molding process is used to mold the part, which may be referred to an intermediate base member 42 or molded member. The molded member 42 is allowed to solidify and cool before being removed from the mold 32 for further processing. It is understood that other processes could also be used to form the intermediate base member 42 including but not limited to injection compression molding, compression molding, micro-molding, bulk compound molding, blow molding, vacuum assisted resin transfer molding, multi-material molding, multi-color molding, rotational molding, etc. (FIG. 5).

Figure 9:
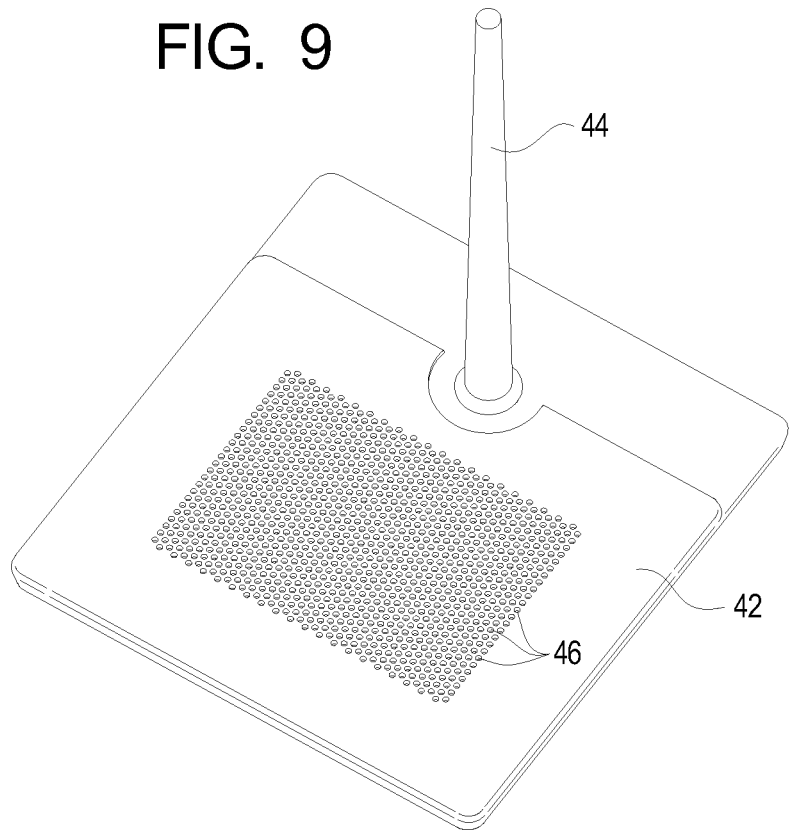
FIG. 9 is a perspective view of an injection molded part having blind holes and prior to additional manufacturing steps.
Figure 10:
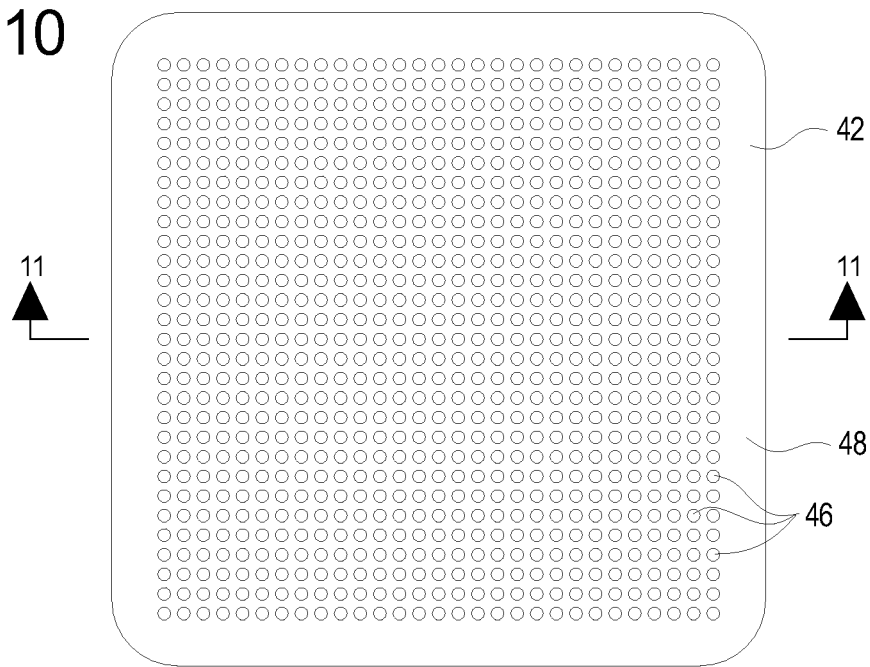
FIG. 10 is a front elevation view of an injection molded part having blind holes and prior to additional manufacturing steps.
Figure 11:
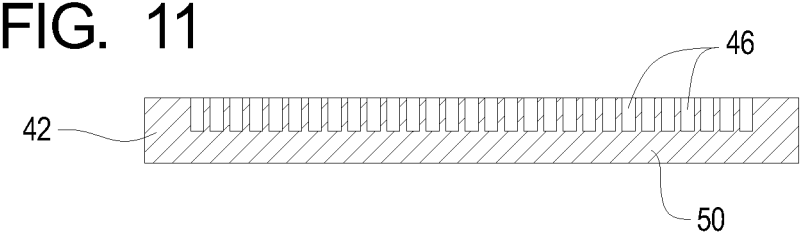
FIG. 11 is a cross-sectional view of the injection molded part taken along lines 11-11 of FIG. 10 and showing blind holes.
Figure 12:
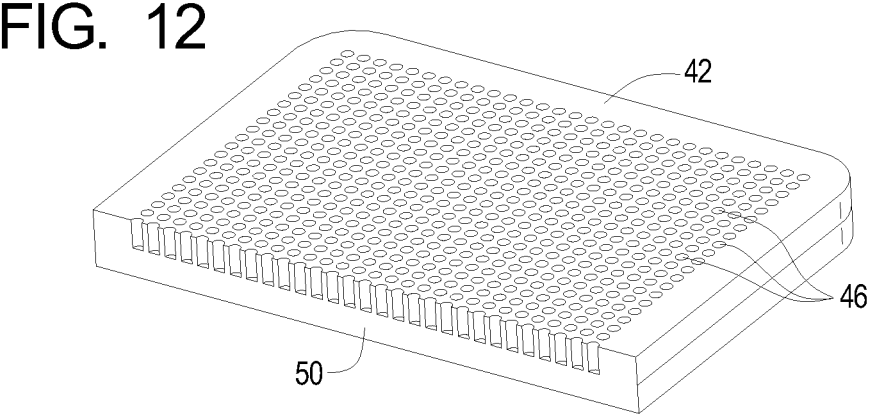
FIG. 12 is a partial cross-sectional view of the injection molded part shown in FIG. 10 and showing blind holes.
Figure 13:
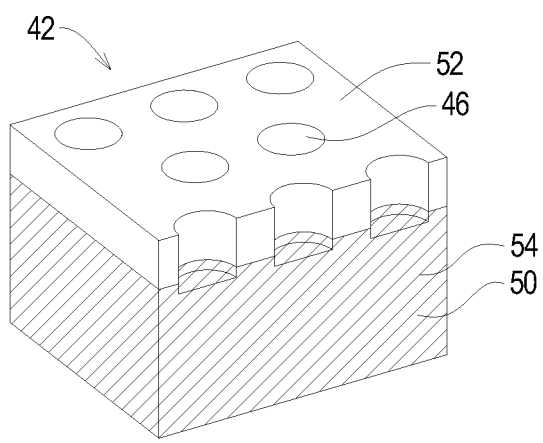
FIG. 13 is an enlarged partial cross-sectional view of the injection molded part indicating additional material to be removed in further manufacturing steps.
Figure 14:
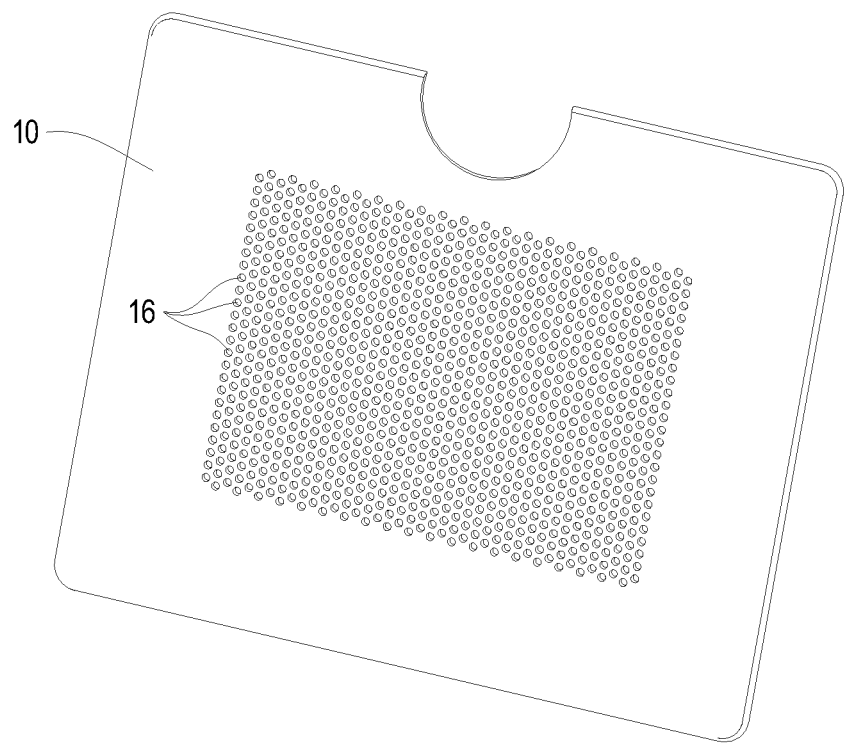
FIG. 14 is a front perspective view of the speaker grill member having through holes; and, FIG. 15 is an enlarged, partial front elevation view of the speaker grill having spaced apertures.
Figure 15:
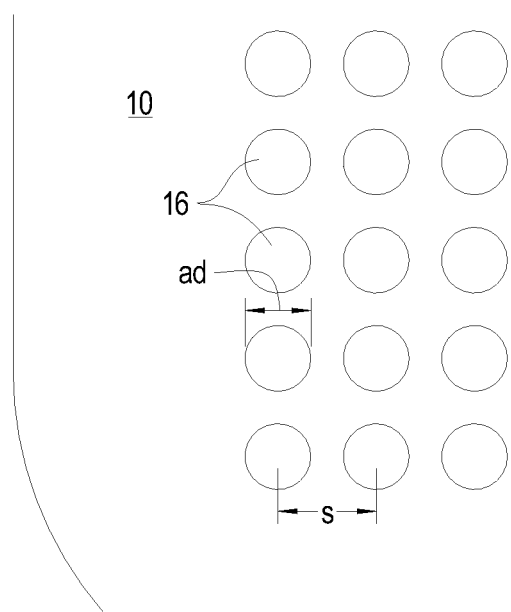

FIGS. 9-13 show the molded part formed from the plastic injection process in the form of the intermediate base member 42. The intermediate base member 42 may be formed to a thickness of approximately 1-3 mm during the process. As shown in FIG. 9, a post 44 may be included in the part to assist in part handling in later steps of the process and then subsequently removed. It is understood that the pins 40 produce a plurality of blind holes 46 in the intermediate base member 42. As shown in FIGS. 11 and 12, the blind holes 46 are one-sided and open towards a first side 48 of the intermediate base member 42. Thus, the first side 48 is in communication with the blind holes 46. The blind holes 46 bottom out within the body of the intermediate base member 42 to define closed ends. A solid portion 50 of the intermediate base member 42 remains adjacent the blind holes 46. The solid portion 50 further defines a second side of the intermediate base member 42 that is generally uniform and uninterrupted. The second side can be considered to be a generally smooth and even surface that may be flat and unruffled. The second side could be generally planar but could also possess an amount of curvature while still having uniform and uninterrupted characteristics based on the construction of the mold members and desired final characteristics and properties of the speaker grill 10. A thickness is maintained between the first side and the second side of the intermediate base member 42.

After the plastic injection molding process forms the intermediate base member 42, the intermediate base member 42 is next subjected to a machining or cutting step to remove a portion of the intermediate base member 42 (FIG. 5.) The intermediate base member 42 is first secured in preparation for machining such as by glue, double-sided tape, vacuum, suction, clamps, vise magnets or other mechanisms. While the machining may be done by a rotating cutter, it is also understood that the intermediate base member 42 could be rotated against a cutting edge. In an exemplary embodiment, a machining tool or cutting tool 52 (FIG. 5) is provided to remove a portion of the intermediate base member 42. As can be understood in FIG. 13, the tool 52 removes a portion 54 of the intermediate base member 42 including the solid portion 50. The removed portion 54 is schematically represented by the darkened bottom portion in FIG. 13. By removing the portion 54 at a certain thickness, the blind holes 46 are transformed and changed to through holes that pass completely through the part and define the apertures 16. Accordingly, the speaker grill 10 or grill member having the desired spaced apertures 16 and desired acoustic transparency is provided.

In one exemplary embodiment, the intermediate base member 42 is molded to an initial thickness of approximately 1-3 mm and the desired thickness of the speaker grill 10 is approximately 0.5 mm. Accordingly, the removed portion is approximately 0.5 to 2.5 mm. It is understood that machining can be done at certain locations wherein the ribs 22 can be defined in the intermediate base member 42 and remain in the completed speaker grill 10. A traditional CNC machining operation can be used to expose the blind holes 46 to apertures 16. Other processes can be used such as face milling, vertical milling, horizontal milling, planning, turning lathe and other processes. It is further understood that coolant materials may also be incorporated into the machining process if necessary.

The speaker grill 10 may then be subjected to additional manufacturing steps. A deburring tool 56 (FIG. 5) is provided to further finish the speaker grill 10. The deburring tool 56 removes small, unwanted remnants of plastic material in acoustically transparent areas or proximate the apertures 16. Such material is often referred to as burrs, which may be detrimental to the acoustic performance of the speaker grill 10 and generally should be removed. The deburring tool can take various different forms including but not limited to knives, cutters, pins and sticks. Automated deburring tools are also possible such as by punching, through use of water jets, by brushing and by sanding with abrasive materials.

If desired, the speaker grill 10 can be subjected to additional or optional manufacturing steps for decoration or other aesthetic purposes. For example, the speaker grill 10 may be decorated or painted as desired. Decoration processes may include but are not limited to painting, physical vapor deposition, foil ink transfer, pad printing, dipping and digital printing. Other cutting, die-cutting or stamping operations can be included to define the desired peripheral shape of the speaker grill 10.

The speaker grill 10 of the present invention can be made from a several different engineered thermoplastic materials including but not limited to: polycarbonate, nylon, ABS, PC/ABS or other thermoplastics. Additional combinations of thermoplastic materials are also possible. Additional plastic injection molding techniques can also be used, such as two-shot molding, etc. The overall size and footprint of the speaker grill can vary as desired.

As shown in FIGS. 2-4 and 14-15, the speaker grill 10 has the apertures 16 that provide a partial open geometry that is necessary for proper acoustic function and proper operation in the wireless speaker assembly 1. In one exemplary embodiment, the speaker grill 10 is more than 35% open. In this exemplary embodiment, the apertures have an aperture diameter ad, wherein the apertures 16 have a minimum diameter of 0.30 mm and a maximum diameter of 1.20 mm. The apertures have a center to center pitch spacing s that is between 0.50 mm and 1.50 mm. The thickness of the speaker grill 10 can vary between 0.40 mm and 3.0 mm. In one particular exemplary embodiment such as shown in the enlarged view in FIG. 15, the diameter ad of the apertures 16 is approximately 0.7 mm, the center to center pitch spacing s is approximately 1.15 mm and the speaker grill thickness is approximately 1.0 mm. As discussed, it is understood that the speaker grill 10 can be a generally flat member, but could also have a curved or contoured configuration.

The speaker grill 10 and the method of manufacture of the speaker grill 10 provide a number of benefits. As the speaker grill is made from plastic, the grill can be beneficially used in the wireless speaker assembly 1. Operation is interference in communication between speakers is reduced (as compared to using metal speaker grills). Using the manufacturing process described herein to create the apertures, the speaker grill 10 can achieve the desired acoustic transparency and open geometry that further enhances operation. The apertures can be sufficiently tightly-spaced (with relatively small center to center pitch spacing) and have the required miniature or miniscule diameter. Speakers grills having apertures of such a small size and spacing have not been possible using plastic injection molding. The apertures in such prior efforts had to be larger in diameter and have a greater spacing. Thus, even though the speaker grill is made of plastic, the grill still retains an aesthetically-pleasing look that users are accustomed to seeing with a metal speaker grill. With the speaker grill of the present invention, the acoustic features and required communication capabilities are achieved in a plastic speaker grill construction. With potential signal transmission interference being reduced with plastic speaker grills, individual speakers of the wireless speaker assembly can be placed farther apart, which also enhances the versatility of the system.

Several embodiments of the invention have been described. It should be understood that the concepts described in connection with one embodiment of the invention may be combined with the concepts described in connection with another embodiment (or other embodiments) of the invention.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

The invention claimed is:

1. A method for manufacturing a plastic speaker grill comprising the steps of:
   injecting molten plastic material in a mold member to form a base member having a first side and an opposing second side and defining a thickness therebetween, the base member having a plurality of spaced blind holes wherein the first side is in communication with the plurality of blind holes and the second side defines a surface that is generally uniform and uninterrupted;
   cutting the base member proximate the second side to remove a portion of the base member and define a grill member wherein the base member is cut at a location such that closed ends of the blind holes are removed wherein apertures are defined in the grill member and wherein the apertures extend completely through the grill member.

2. The method of claim 1 further comprising the step of deburring the base member to remove unwanted remnants of plastic material.

3. A method for manufacturing a plastic speaker grill comprising the steps of:

providing a first mold member and a second mold member collectively defining a cavity, the first mold member having a plurality of spaced mold pins extending into the cavity wherein distal ends of the pins are spaced from the second mold member;

injecting molten plastic into the cavity and around the plurality of spaced mold pins to form a base member, the base member having a first side and an opposing second side and defining a thickness therebetween, the base member having a plurality of spaced blind holes wherein the first side is in communication with the plurality of blind holes and the second side defines a surface that is generally uniform and uninterrupted;

removing the base member from the mold members;

cutting the base member proximate the second side to remove a portion of the base member and define a grill member, wherein the removed portion of the base member exposes the blind holes to define apertures that extend completely through the grill member; and deburring the grill member to remove unwanted remnants of plastic material.

4. The method of claim 3 comprising after the step of deburring, depositing colored material onto the grill member.

5. The method of claim 3 wherein the step of deburring includes removing unwanted material from the apertures.

6. The method of claim 3 wherein after the step of deburring, further comprising cutting the grill member to define a desired outer periphery.

\* \* \* \* \*